United States Patent [19]

Ninane et al.

[11] Patent Number: 5,478,447
[45] Date of Patent: Dec. 26, 1995

[54] METHOD FOR PRODUCING AN AQUEOUS INDUSTRIAL SODIUM CHLORIDE SOLUTION

[75] Inventors: Léon Ninane, Dombasle-sur-Meurthe; Jean-Francois Adam, Comps; Cédric Humblot, Dombasle-sur-Meurthe, all of France

[73] Assignee: Solvay (Société Anonyme), Brussels, Belgium

[21] Appl. No.: 204,261

[22] PCT Filed: Aug. 31, 1992

[86] PCT No.: PCT/EP92/00944

§ 371 Date: Apr. 22, 1994

§ 102(e) Date: Apr. 22, 1994

[87] PCT Pub. No.: WO93/04983

PCT Pub. Date: Mar. 18, 1993

[30] Foreign Application Priority Data

Sep. 10, 1991 [BE] Belgium ................................ 09100843

[51] Int. Cl.⁶ .............................. C01D 3/14; C01D 3/16; B01D 53/34

[52] U.S. Cl. ...................... 204/98; 423/179; 423/499.4; 423/499.5

[58] Field of Search .................... 204/98, 128, 182.4, 204/182.5; 423/239.1, 235, 420, 424, 244, 240 R, 499.4, 499.5, 423, 179

[56] References Cited

U.S. PATENT DOCUMENTS

| | | | |
|---|---|---|---|
| 2,829,095 | 4/1958 | Oda et al. | 204/98 |
| 3,647,396 | 3/1972 | DeWittie et al. | 23/299 |
| 3,944,474 | 3/1976 | Verlaeten | 204/87 |

(List continued on next page.)

FOREIGN PATENT DOCUMENTS

| | | |
|---|---|---|
| 1004216A3 | 12/1986 | Belgium . |
| 1003943A3 | 12/1986 | Belgium . |
| 0087934 | 9/1983 | European Pat. Off. . |
| 0190416 | 8/1986 | European Pat. Off. . |
| 0253430 | 1/1988 | European Pat. Off. . |
| 0352847 | 1/1990 | European Pat. Off. . |
| 2545079 | 11/1984 | France . |
| 55-104632 | 8/1980 | Japan . |
| 1082436 | 9/1967 | United Kingdom . |
| 1084436 | 9/1967 | United Kingdom . |
| 1375126 | 11/1974 | United Kingdom . |
| 2005723 | 4/1979 | United Kingdom . |

OTHER PUBLICATIONS

Ian F. White et al.: "Secondary Brine Treatment: Ion-Exchange Purification of Brine". pp. 271–289 (no date).
Dale W. Kaufmann "Sodium Chloride—The Production and Properties of Salt and Brine". Reinhold Publishing Corporation, New York. 1960, pp. 204–275. (no month).
J. J. Wolff et al.: "Ion-exchange Purification of feed brine for chlor-alkali electrolysis cells; the role of Duolite ES-467." The American Institute of Chemical Engineers, No. 219, vol. 78, 1982, pp. 46–53 (no month).
J. S. Sconce: "Chlorine—Its Manufacture, Properties and Uses". Reinhold Publishing Corporation, New York, 1962, pp. 119–199 (no month).
"Sodium bicarbonate Purification of flue gases" Solvay & Cie, brochure Tr. 895/5c-B-1-1290 (no date).
Wolff et al. "Ion Exchange Purification of Feed Brine For Chlor-Alkali Electrolysis cell": the Role of Duolite ®ES-46 (1982) pp. 46–53 no month.

*Primary Examiner*—John Niebling
*Assistant Examiner*—Arun S. Phasge
*Attorney, Agent, or Firm*—Spencer, Frank & Schneider

[57] ABSTRACT

Process for the manufacture of an industrial aqueous solution of sodium chloride, according to which an aqueous mixture (12) containing an aqueous solution of sodium chloride and of polyvalent metals is prepared by introducing into water (10) a solid product (8) collected from the dry-route treatment, with sodium bicarbonate (4), of smokes (2) containing hydrogen chloride, and the said aqueous medium (12) is treated in order to remove the polyvalent metals therefrom.

11 Claims, 4 Drawing Sheets

U.S. PATENT DOCUMENTS

| | | | |
|---|---|---|---|
| 4,002,564 | 1/1977 | Carbonel et al. | 210/38 R |
| 4,155,819 | 5/1979 | Carlin | 204/98 |
| 4,155,820 | 5/1979 | Ogawa et al. | 204/98 |
| 4,605,771 | 8/1986 | Ninane et al. | 564/497 |
| 4,767,605 | 8/1988 | Lindbauer et al. | 423/239 |

METHOD FOR PRODUCING AN AQUEOUS INDUSTRIAL SODIUM CHLORIDE SOLUTION

FIELD OF THE INVENTION

The invention relates to a process for the manufacture of aqueous sodium chloride solutions which can be employed in industrial processes.

TECHNOLOGY REVIEW

Aqueous sodium chloride solutions find important applications in industry. This is the case in particular in the industry for the manufacture of sodium carbonate by the ammonia-soda process, and in the processes for electrolytic manufacture of chlorine and of aqueous sodium hydroxide solutions.

These industrial processes generally require aqueous sodium chloride solutions of high purity, especially in respect of polyvalent metals such as, for example, calcium, magnesium, aluminium, iron, lead and zinc. This requirement is particularly strict in the case of electrolytic processes using membranes which are selectively permeable to cations, such as perfluorinated polymer membranes containing functional groups derived from carboxylic acid (GB-A-1,375,126). In these electrolytic processes sodium chloride solutions are generally recommended in which the polyvalent cation content, especially of calcium cations, does not exceed 0.1 ppm (GB-A-2,005,723).

The aqueous solutions intended for the electrolysis cells are generally obtained by dissolving rock salt in water (Chlorine, Its manufacture, Properties and Uses—J. S. Sconce—Reinhold Publishing Corporation, New York—1962—pages 119 and 123). However, the raw brines obtained by dissolving rock salt in water generally have a polyvalent cation content which is too high to permit their use in the electrolytic processes. It has been proposed, for this purpose, to treat them on chelating resins of the Na type, with the aim of extracting the polyvalent cations therefrom. (The American Institute of Chemical Engineers, No. 219, vol. 78, 1982, pages 46–53 :J. J. Wolff and R. E. Anderson, Ion-exchange purification of feed brine for chlor-alkali electrolysis cells; the role of Duolite ES-467).

Furthermore, there is a known process for purifying a smoke containing hydrogen chloride, according to which this smoke is treated with sodium bicarbonate so as to decompose the hydrogen chloride and to form sodium chloride (U.S. Pat. No. 4,767,605; SOLVAY & Cie, brochure Tr. 895/5c-B-1-1290). According to this known process sodium bicarbonate in powder form is introduced into the smoke to be purified and a solid residue containing sodium chloride is separated from the latter. When the smoke which is treated contains heavy metals, as is generally the case with smokes produced by the incineration of domestic or municipal waste, the solid sodium chloride residue is contaminated with these heavy metals, which thus cause difficulties in the storage or dumping of this residue.

The invention is aimed at providing a process which makes it possible to recover the solid sodium chloride residue from the known process described above, to manufacture an aqueous sodium chloride solution which can be employed in industrial processes.

SUMMARY OF THE INVENTION

Consequently, the invention relates to a process for the manufacture of an industrial aqueous solution of sodium chloride, according to which an aqueous medium comprising an aqueous solution of sodium chloride and of polyvalent metals is prepared and the said aqueous medium is treated to remove the polyvalent metals therefrom; according to the invention, in order to prepare the aqueous medium, a solid product collected from the dry-route treatment, with sodium bicarbonate, of a smoke containing hydrogen chloride and polyvalent metals is introduced into water.

DETAILED DESCRIPTION OF THE INVENTION

In the process according to the invention an industrial aqueous solution of sodium chloride is intended to denote an aqueous sodium chloride solution which is intended to be involved in the technical activity of an industry.

The aqueous medium employed includes an aqueous solution of sodium chloride and of polyvalent metals. The aqueous solution usually also includes some sodium sulphate resulting from the reaction of sodium bicarbonate with the sulphur oxide present in the smoke and some sodium carbonate corresponding to the excess sodium bicarbonate used in the smoke treatment. The polyvalent metals of the aqueous medium are metals of valency higher than 1 and include the heavy metals. These metals may be present in the form of compounds which are dissolved and/or insoluble in the aqueous sodium chloride solution. In accordance with the invention this aqueous medium is obtained by introducing into water a solid product collected during the dry-route treatment, with sodium bicarbonate, of a smoke containing hydrogen chloride and polyvalent metals.

"Dry-route treatment of a smoke with sodium bicarbonate" is intended to mean a treatment in which sodium bicarbonate is introduced in the solid state into the smoke, in the absence of a liquid, in particular of water. In general, the sodium bicarbonate is used in the form of a powder which is injected into a smoke stream moving inside a reaction chamber. In the latter the sodium bicarbonate decomposes the hydrogen chloride present in the smoke, forming sodium chloride. It is advantageous to employ a sodium bicarbonate powder of uniform particle size which is as fine as possible, so as to accelerate the decomposition of the hydrogen chloride. As a general rule it is recommended to employ a sodium bicarbonate powder whose mean particle diameter is smaller than 50 µm. The preferred particle size corresponds to a mean particle diameter not exceeding 25 µm, for example between 5 and 20 µm.

The solid product collected during the treatment of the smoke with sodium bicarbonate contains sodium chloride (resulting from the reaction of hydrogen chloride with sodium bicarbonate) and polyvalent metals in the metallic or combined state. In the case of a smoke containing sulphur oxides the solid product also contains sodium sulphate (originating from the reaction of sulphur oxides with sodium bicarbonate). It generally also contains some sodium carbonate corresponding to the excess of sodium bicarbonate used to react with hydrogen chloride and, where appropriate, sulphur oxides.

The abovementioned aqueous medium is obtained by introducing the abovementioned solid product into water. The quantity of water which is used must be at least sufficient to dissolve all of the sodium chloride and the other soluble matter in the solid product. Notwithstanding this condition, the quantity of water is not critical. However, there is no advantage in employing an excessive quantity of water. As an alternative, a dilute sodium chloride solution can also be employed instead of water.

The origin of the smoke is not critical, the latter necessarily containing hydrogen chloride and polyvalent metals in the metallic or combined state. The invention applies especially to the smokes produced by the incineration of domestic or municipal waste, which usually contain chlorine compounds, metal chlorides and polyvalent metals (VGB Kraftwerkstechnik, 69, Part 2, 1989, pages 212–220). Depending on the source of the waste, the polyvalent metals entrained by the smokes include cadmium, mercury, antimony, lead, cobalt, chromium, copper, manganese, vanadium, tin, iron, nickel, calcium, magnesium, aluminium and zinc, this list not being exhaustive.

In the process according to the invention the removal of the polyvalent metals from the aqueous medium may be obtained by any appropriate means.

In a preferred embodiment of the process an alkaline aqueous medium is used so as to obtain the polyvalent metals in the form of a precipitate of metal hydroxides, this precipitate is separated from the aqueous medium and the resulting aqueous liquid is treated on a chelating resin. In this embodiment of the process according to the invention the aqueous liquid has an alkaline pH and can be treated as it is on the chelating resin. It is advantageous to regulate its pH between 8 and 14. The alkalinity of the aqueous medium can be produced by the dissolved sodium carbonate which it contains and which corresponds to the excess of sodium bicarbonate used for the smoke treatment. If need be a supplementary addition of an inorganic base may be made, such as, for example, sodium carbonate or sodium hydroxide.

The chelating resins employed in this form of embodiment of the process according to the invention are well known in the art. They include a polymeric backbone onto which are grafted complexing functional groups including interchangeable cations. Examples of polymers which can be employed for the polymeric backbone include polyolefins (for example polyethylene), polymers derived from styrene (for example copolymers derived from styrene and divinylbenzene) and acrylic resins. The resin is generally in the form of granules, in contact with which the aqueous liquid is circulated.

In the form of embodiment of the invention which has just been described a chelating resin of the H type can be used just as well as one of the Na type. However, resins of the Na type (which are resins in which the interchangeable cations are sodium cations) are preferred because, everything else being equal, they ensure an optimum extraction of the polyvalent metal ions, especially of calcium, according to the process described in the document "The American Institute of Chemical Engineers, No. 219, vol. 78, 1982, pages 46–53: J. J. Wolff and R. E. Anderson, Ion-exchange purification of feed brine for chlor-alkali electrolysis cells; the role of Duolite ES-467". At the end of the process the resin must be regenerated, and this can be done in a manner known per se by treating it with an aqueous solution of hydrochloric acid; in the case of a resin of Na type the treatment with the hydrochloric acid solution is followed by a treatment with an aqueous sodium hydroxide solution.

The preferred chelating resins within the scope of the invention are those in which the functional groups include a nitrogen ligand. The latter may, for example, include compounds derived from amines or imines. Chelating resins which are especially recommended are those including functional groups derived from organic acids, those including functional groups derived from iminodiacetic acid or aminophosphonic acid being preferred. Such resins are described especially in Patent U.S. Pat. No. 4,002,564 (Diamond Shamrock Corp.) and in Patent Application EP-A-0,087,934 (Duolite International S.A.). Examples of resins which can be employed in the process according to the invention are those marketed under the names Duolite (Rohm & Haas Company) and Lewatit (Bayer AG). In the particular case where the aqueous liquid contains mercury it is advantageous to precede the treatment on the resin containing nitrogen ligands with a treatment on a chelating resin containing sulphur ligands, in order to bind the mercury thereon.

In a particular alternative form of the preferred embodiment the alkaline aqueous medium is acidified and filtered. In this alternative form of the invention the acidification can be carried out by addition of an aqueous hydrochloric acid solution to the aqueous medium. Its purpose is to decompose the sodium carbonate and to dissolve the polyvalent metals. The filtration is used to remove the insoluble matter, especially the fly ash from the smoke.

When the aqueous medium contains $SO_4^{2-}$ anions, it may be desirable, in some applications, to prevent these anions from moving into the industrial aqueous solution of sodium chloride. To this end, according to another alternative form of the abovementioned preferred embodiment of the invention, the $SO_4^{2-}$ anions are precipitated in the form of calcium sulphate with the aid of calcium hydroxide or chloride. In this alternative form of embodiment of the invention the operation can be carried out by a number of separate routes.

According to a first route the calcium hydroxide or chloride is added to the aqueous liquid collected after separation of the precipitate of metal hydroxides. The calcium sulphate then precipitates in the form of relatively uncontaminated gypsum which, as a result, can be easily recovered industrially or dumped as such on a tip. Where appropriate, it does not require a specialised tip, and this is an economical advantage. In the case where the aqueous medium contains carbonate ions, a sufficient quantity of calcium hydroxide or chloride must be used to react with the sulphate ions and with the carbonate ions of the aqueous liquid, with calcium carbonate then being precipitated before the formation of calcium sulphate.

According to a second operating route the alkaline medium is acidified, for example by addition of hydrochloric acid, and a sufficient quantity of calcium chloride is added to it to form calcium sulphate with the sulphate ions. The objective of the acidification is to decompose the carbonate ions and to solubilise the polyvalent metals. It is preferably regulated to impart to the aqueous medium a pH value lower than 6, for example between 3 and 5. After separation of the calcium sulphate precipitate (generally in the form of gypsum) the aqueous medium is alkalified (preferably by addition of sodium hydroxide) and is then treated as described above in order to extract the polyvalent metals therefrom.

According to a third route the alkaline medium is acidified to begin with, for example by addition of hydrochloric acid, and is then alkalified by adding to it calcium hydroxide and, optionally, sodium hydroxide. The acidification is performed under the same conditions as in the abovementioned second route so as to decompose the carbonate ions and solubilise the polyvalent metals. The quantity of calcium hydroxide which is used subsequently must be at least sufficient to react with all of the sulphate anions of the aqueous medium; furthermore, the overall quantity of calcium hydroxide and sodium hydroxide must be sufficient to produce an alkaline pH (preferably equal to at least 8) in the aqueous medium. In this third operating route of the process the calcium sulphate (generally in the form of gypsum) and the metal hydroxides precipitate simultaneously, and this constitutes an advantage. It has been observed, in fact, that this coprecipitation facilitates and accelerates the settling of the precipitate and improves the subsequent separation of the precipitate and the recovery of the aqueous liquid.

The process according to the invention makes it possible to obtain industrial aqueous solutions of sodium chloride of very high purity in which the polyvalent metal ion content is lower than 1 ppm. In particular, it makes it possible to obtain saturated aqueous sodium chloride solutions which have a calcium weight content lower than 0.1 ppm and generally not exceeding 0.05 ppm.

The aqueous sodium chloride solutions obtained by means of the process according to the invention consequently find various applications in industry. They can be used in particular as a raw material for the manufacture of sodium carbonate by the ammonia-soda process (Manufacture of Soda—Te-Pang Hou—Hafner Publishing Company—1969), for the electrolytic manufacture of chlorine and aqueous sodium hydroxide solutions, for the electrolytic manufacture of aqueous sodium chlorate solutions and for the manufacture of solid salt.

The invention consequently also relates to the use of the aqueous sodium chloride solution obtained by means of the process according to the invention for the manufacture of an aqueous sodium hydroxide solution by electrolysis or electrodialysis. Processes for electrolytic manufacture of aqueous sodium hydroxide solutions are well known in the art and include especially the mercury cathode cell process and the selectively cation-permeable membrane cell process (Chlorine, Its manufacture, Properties and Uses—J. S. Sconce—Reinhold Publishing Corporation, New York—1962—pages 127 to 199; European Patent EP-B-0,253,430 and Belgian Patent Applications 09000497 (now Belgian Patent 1004126) and 09000924 (now Belgian Patent 1003943), all three in the name of Solvay & Cie). Processes for the manufacture of aqueous sodium hydroxide solutions by electrodialysis are also well known in the art (Patent U.S. Pat. No. 2,829,095 Noguchi Kenkyu-Jo). According to the invention the raw material employed in the electrolysis or electrodialysis is an industrial aqueous solution of sodium chloride, obtained by means of the process in accordance with the invention, described above.

Another subject of the invention is the use of the aqueous sodium chloride solution obtained by means of the process according to the invention for the manufacture of sodium chloride crystals. The manufacture of crystals of sodium chloride of high purity by evaporation of aqueous sodium chloride solutions is well known in the art (Sodium Chloride—Dale W. Kaufmann—Reinhold Publishing Corporation, New York—1960—pages 205 to 274; European Patent Application EP-A-0,352,847—Solvay & Cie). According to the invention an industrial aqueous solution obtained by means of the process in accordance with the invention, described above, is employed as the aqueous sodium chloride solution subjected to evaporation.

An additional subject of the invention is the use of the industrial aqueous solution of sodium chloride for the manufacture of sodium carbonate by the ammonia-soda technique or by the insoluble amines technique. The ammonia-soda technique (also called the Solvay process) is well known and comprises dissolving ammonia gas in an aqueous sodium chloride solution so as to produce an ammoniacal brine, treatment of this ammoniacal brine with a gas containing carbon dioxide so as to crystallise sodium bicarbonate and the conversion of the latter to sodium carbonate (Te-Pang Hou, Manufacture of Soda with special reference to the Ammonia Process, 1969, Hafner Publishing Company). In the technique using amines an aqueous sodium chloride solution and an organic solution of a water-insoluble amine are mixed and the resulting mixture is treated with a gas containing carbon dioxide to crystallise sodium bicarbonate, which is collected and which is next converted into sodium carbonate [Patents GB-A-1,082,436 (Kaiser Aluminum & Chemical Corporation) and FR-A-2,545,079 (Solvay & Cie)]. According to the invention the aqueous sodium chloride solution employed in these two techniques is an industrial aqueous solution obtained by means of the process in accordance with the invention, described above.

The invention performs, in an original and economical manner, a recovery of residues originating from smoke purification. It is very specially suited to the treatment of smokes originating from plants for the incineration of domestic or municipal waste.

Special features and details of the invention will appear in the course of the description of a number of embodiments which is to follow, with reference to the attached drawings.

Figure 1:
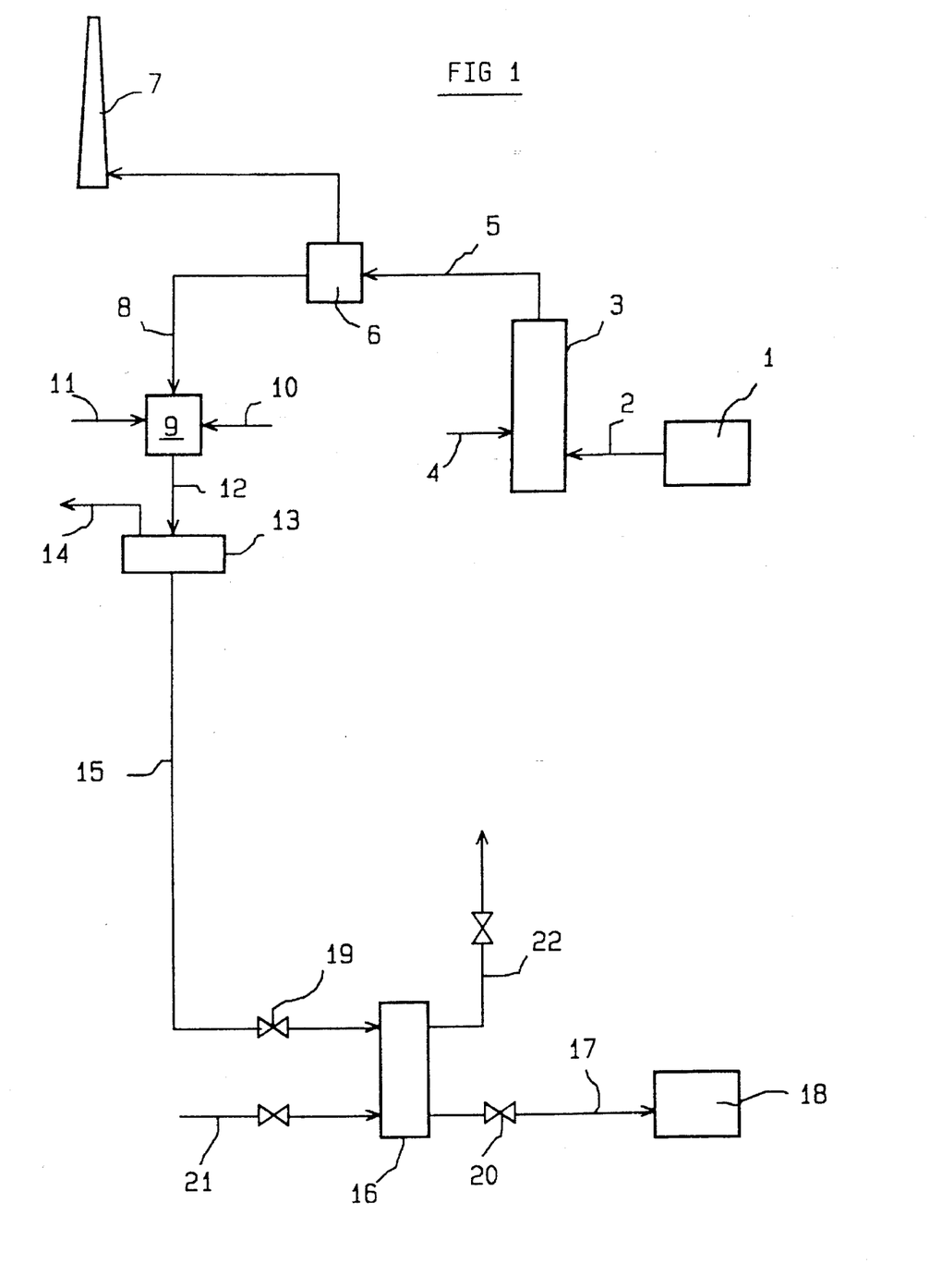
FIG. 1 shows a schematic diagram of a plant using a particular embodiment of the invention.

FIG. 1 shows the diagram of a plant using a particular embodiment of the invention.

Figure 2:
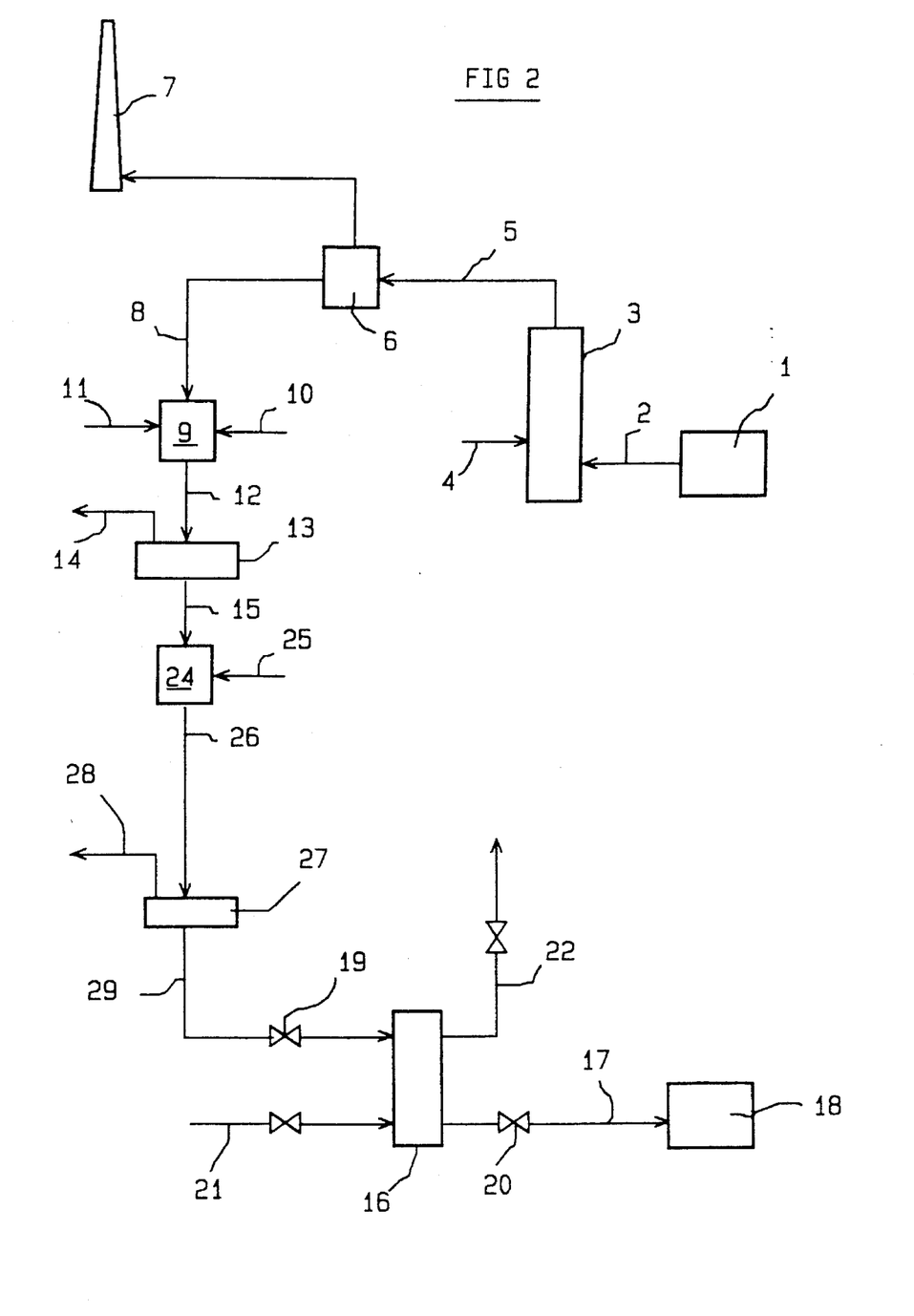
FIGS. 2, 3, and 4 are also schematic diagrams illustrating three other embodiments of the invention. Each of these embodiments is described below.
Figure 3:
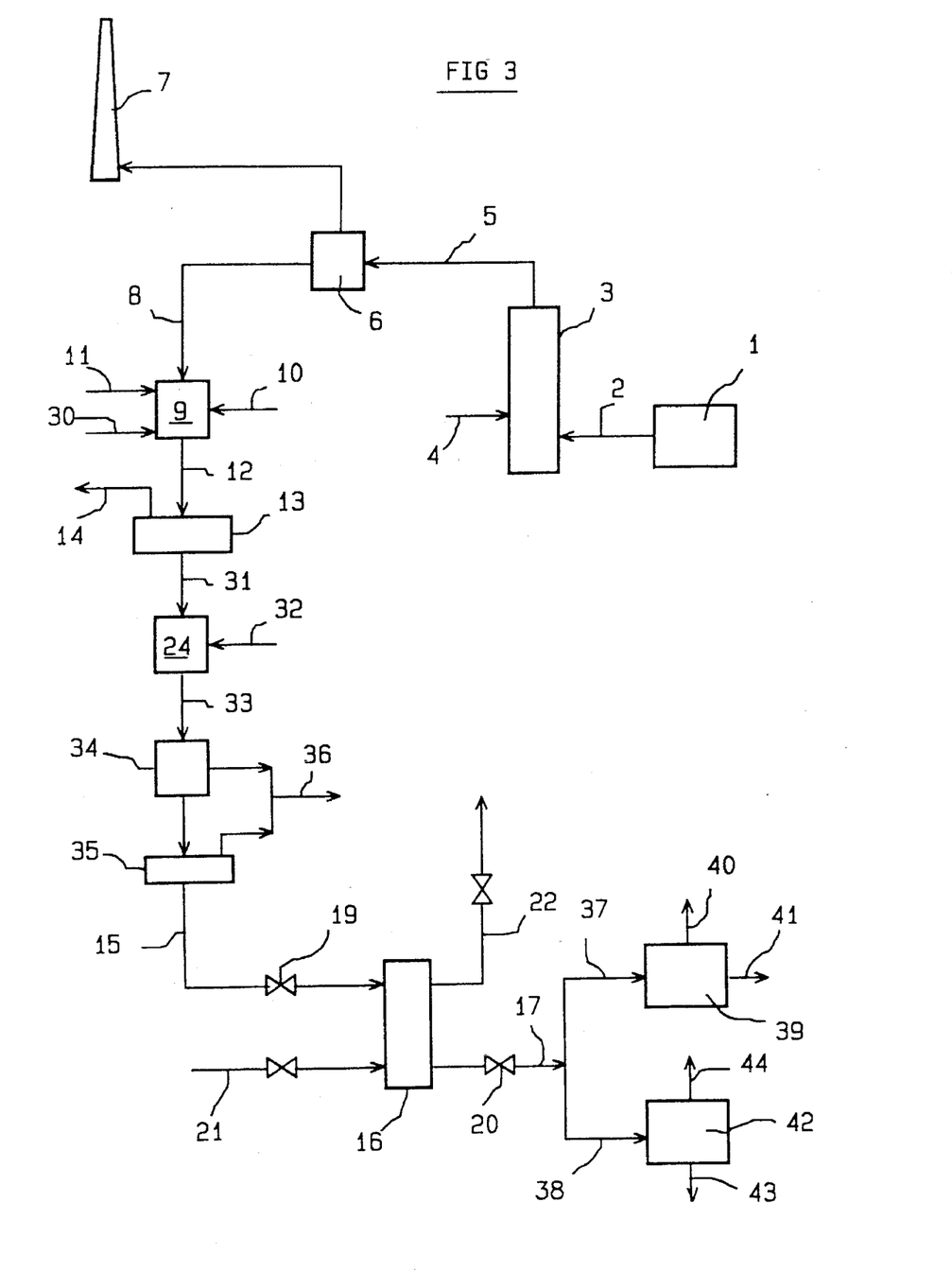
Figure 4:
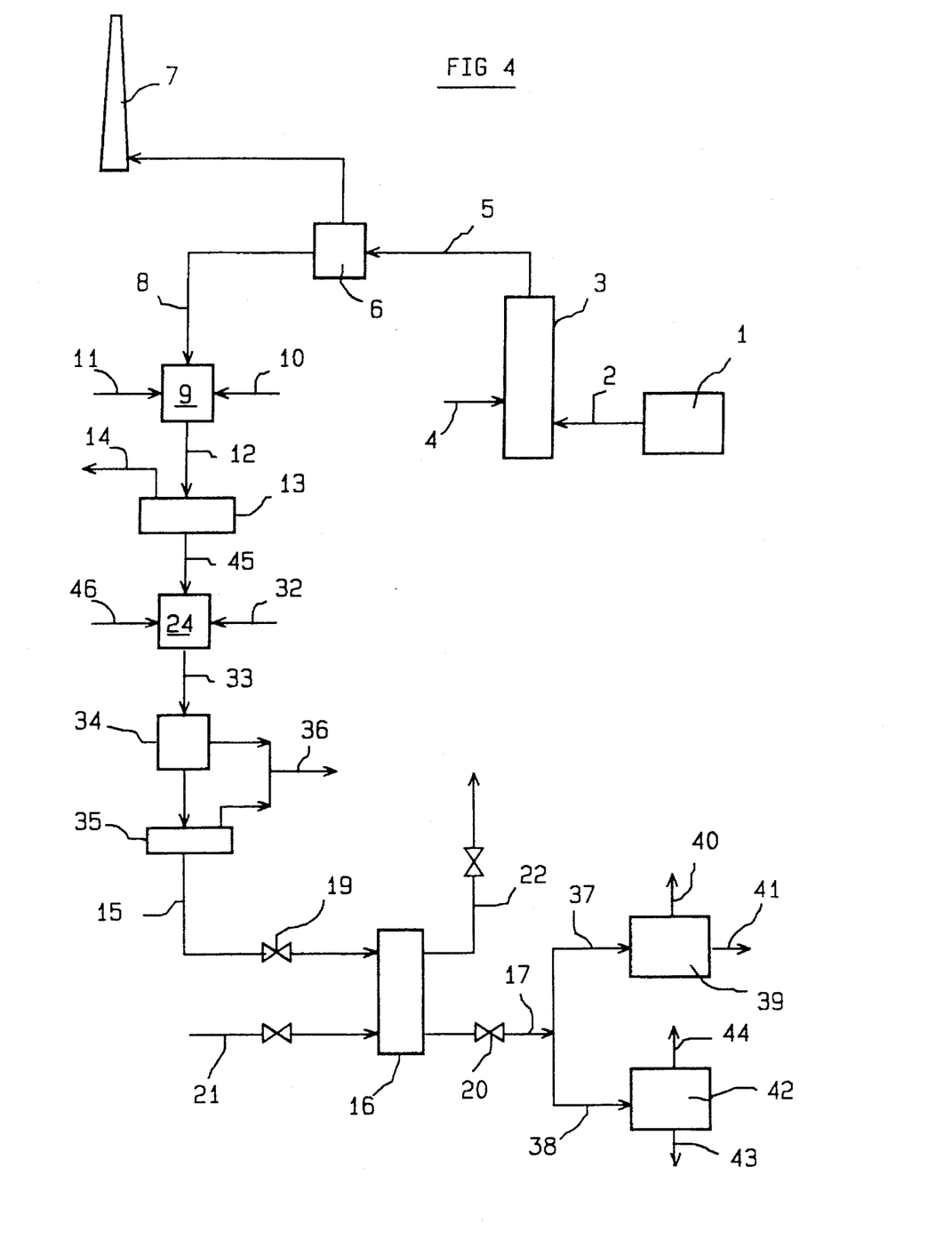

FIGS. 2, 3 and 4 are three schemes similar to that of FIG. 1, of plants which use, respectively, three other embodiments of the invention.

In these figures the same reference numbers denote identical components.

The plants shown in the figures are designed to purify a smoke originating from the incineration of domestic or municipal waste and to recover the effluents collected from the purification of this smoke. This smoke contains hydrogen chloride, sulphur dioxide and polyvalent metals (for example: cadmium, mercury, antimony, lead, cobalt, chromium, copper, manganese, vanadium, tin, nickel, calcium, magnesium, aluminium, zinc, this list not being exhaustive). It additionally contains fly ash. This smoke is indicated by reference number 2 on the attached drawing.

The plants comprise a tubular reactor 3 fed, in its lower part, with the smoke 2 emitted by an incinerator for domestic waste 1. Sodium bicarbonate 4 in the form of an anhydrous powder is injected into the smoke 2 in the reactor 3. In the reactor 3 the sodium bicarbonate reacts with the hydrogen chloride in the smoke, forming sodium chloride. Furthermore, it reacts with sulphur dioxide, forming sodium sulphate. The smoke 5 extracted from the upper part of the reactor 3 passes through a dust separator 6 and is then removed to the stack 7. Since the smoke 5 is dry, the dust separator 6 may advantageously consist of a mechanical separator with filter fabrics (bag filter) whose efficiency is optimum. Other types of separators can also be employed, such as, for example, electrostatic filters.

In the dust separator 6 the smoke 5 is freed from the solid particles 8 which it contains. The latter include sodium chloride, sodium sulphate, sodium carbonate, polyvalent metals and fly ash.

In the plant shown in FIG. 1 this solid product 8 is introduced into a dissolving chamber 9 where it is dispersed in a sufficient quantity of water 10 to dissolve all of the water-soluble matter which it contains. The aqueous medium thus obtained is generally alkaline. Its pH is adjusted to a value of between 8 and 14 by addition of an aqueous solution 11 of sodium hydroxide or hydrochloric acid, depending on whether its initial pH is lower or higher than the required value. The alkaline aqueous medium 12 drawn off from the chamber 9 contains the polyvalent metals in the form of insoluble metal hydroxides. It is treated on a filter 13 to separate off the insoluble matter 14 (fly ash and polyvalent metal hydroxides). The aqueous liquid 15 collected from the filter 13 is an aqueous solution of sodium chloride, sodium sulphate and sodium carbonate. It is contaminated with dissolved polyvalent metals in a quantity which is generally too high to allow it to be used in an industrial process. According to the invention it is circulated in a column 16 in contact with a chelating resin containing functional groups of the Na type, derived from aminophosphonic acid. Consequently, in column 16 an ion exchange takes place between the sodium cations of the resin and the polyvalent cations of the aqueous liquid 15. An industrial aqueous solution of sodium chloride 17 is collected from the column 16, and is sufficiently pure to allow it to be employed as such in an industrial process. The solution 17 containing dissolved sodium sulphate and carbonate finds use in an industrial plant 18 used for the manufacture of sodium carbonate by the ammonia-soda technique.

In the plant shown in FIG. 2 the alkaline aqueous liquid 15 (aqueous solution of sodium chloride, sodium sulphate and sodium carbonate, contaminated with dissolved polyvalent metals) is obtained as described above with reference to FIG. 1. It is conveyed to a reaction chamber 24 where an aqueous calcium chloride solution 25 is added to it in a sufficient quantity to react with all of the sodium carbonate and sulphate and to precipitate calcium carbonate and calcium sulphate (gypsum). The aqueous suspension 26 collected from the reaction chamber 24 is treated on a filter 27 in order to separate from it the calcium carbonate and sulphate precipitate 28, which is set aside. The aqueous sodium chloride solution 29 collected from the filter 27 is conveyed to the column 16 to be treated therein on the chelating resin as described above with reference to FIG. 1.

In the plant shown in FIG. 3 a sufficient quantity of hydrochloric acid 11 is introduced into the reaction chamber 9 to acidify the aqueous medium present therein, to decompose the carbonate ions and to dissolve the polyvalent metals. In addition, an aqueous calcium chloride solution 30 is introduced into it in sufficient quantity to react with the sodium sulphate and to precipitate gypsum.

The acidic aqueous medium 12 collected from the reaction chamber 9 is conveyed to the filter 13, where the insoluble matter 14 (calcium sulphate and fly ash) is separated off. An aqueous solution 31 of sodium chloride, free from sodium sulphate and carbonate and containing polyvalent metals in the dissolved state is collected from the filter 13. The solution 31 is conveyed to the reaction chamber 24, where it is alkalified to a pH of between 8 and 14 by addition of an aqueous sodium hydroxide solution 32. The alkalifying results in the precipitation of the polyvalent metals in the form of metal hydroxides. An aqueous suspension 33 is consequently collected from the chamber 24 and is treated successively in a settling chamber 34 and on a filter 35, where a precipitate 36 of polyvalent metal hydroxides is separated therefrom and is set aside. The aqueous liquid 15 collected from the filter 35 is an aqueous sodium chloride solution contaminated with dissolved polyvalent metals. It is conveyed into the column 16 to be treated therein as described above with reference to FIG. 1. The solution 17 collected from the column 16 is an aqueous solution of sodium chloride of high purity, substantially free from polyvalent metals and from sulphate and carbonate ions. It is divided into two fractions, 37 and 38.

Fraction 37 is conveyed, in accordance with the invention, into an electrolysis cell 39 equipped with selectively cation-permeable membranes. In the electrolysis cell 39 the solution 37 undergoes an electrolysis in a manner known per se, resulting in the production of chlorine 40 and of an aqueous sodium hydroxide solution 41.

Fraction 38 is conveyed to an evaporator 42, from which crystallised sodium chloride 43 and steam 44 are collected. The solid sodium chloride 43 finds various industrial applications.

In the plant shown in FIG. 4 a sufficient quantity of hydrochloric acid 11 is introduced into the dissolving chamber 9 to acidify the aqueous mixture present therein, to decompose the carbonate ions and to dissolve the polyvalent metals.

The acidic aqueous medium 12 collected from the reaction chamber 9 is an aqueous solution of sodium chloride and sodium sulphate, additionally containing dissolved polyvalent metals. It is conveyed to the filter 13, where the insoluble matter 14 (essentially fly ash) is separated off. An aqueous solution 45 of sodium chloride and sodium sulphate, containing the polyvalent metals in the dissolved state is collected from the filter 13. The solution 45 is conveyed into the reaction chamber 24. In the chamber 24 the solution 45 will be alkalified to a pH of between 8 and 14 and in addition, the sulphate cations which it contains will be precipitated in the form of gypsum. For this purpose a milk of lime 46 is introduced into the chamber 24 in sufficient quantity to decompose all of the sodium sulphate in the solution 45 and, if need be, a top-up 32 of an aqueous sodium hydroxide solution is also added so as to bring the pH to the desired value, between 8 and 14. The polyvalent metals thus coprecipitate in the form of metal hydroxides with calcium sulphate. Consequently an aqueous suspension 33 is collected from the chamber 24 and is treated successively in the settling chamber 34 and on the filter 35, where a coprecipitate 36 of polyvalent metal hydroxides and gypsum is separated therefrom and is set aside. An aqueous liquid 15 is collected from the filter 35 and is treated as described above with reference to FIG. 3.

In a particular alternative implementation of the embodiments in FIGS. 1 to 4, the smoke 2 is treated on an appropriate filter, not shown, to separate fly ash therefrom and is then introduced into the reactor 3.

In the embodiments described above with reference to FIGS. 1 to 4 the chelating resin in the column 16 must be regenerated at regular intervals. For this purpose the column 16 is isolated from the conduits 15 (or 29) and 17 by means of isolating valves 19 and 20, and the operation is then continued in two successive stages, as described in the document "The American Institute of Chemical Engineers, No. 219, vol. 78, pages 46–53: J. J. Wolff and R. E. Anderson, Ion-exchange purification of feed brine for chlor-alkali electrolysis cells; the role of Duolite ES-467". In a first stage an aqueous hydrochloric acid solution is introduced into the column 16 via the conduit 21 to substitute the protons on the active sites of the chelating resin and a dilute aqueous solution of hydrochloric acid containing the polyvalent metals is collected via the conduit 22. In the second stage an aqueous sodium hydroxide solution is introduced via the conduit 21 in order to substitute sodium cations for the protons of the active sites of the resin and a dilute aqueous sodium hydroxide solution is collected via the conduit 22. The dilute aqueous hydrochloric acid solution and the dilute aqueous sodium hydroxide solution can be recycled into the process. For example, in the case of the embodiment of FIG. 4 the dilute aqueous sodium hydroxide solution can be recycled into the reaction chamber 9, and the dilute aqueous sodium hydroxide solution can be recycled into the reaction chamber 24.

What is claimed is:

1. A process for purification of a smoke containing hydrogen chloride and heavy metals, and for manufacture of an aqueous solution of sodium chloride, comprising:

in a first step, treating a smoke containing hydrogen chloride and heavy metals, with a sodium bicarbonate powder and reacting the sodium bicarbonate with the hydrogen chloride to form a solid sodium chloride residue with said heavy metals;

in a second step, recovering said solid residue containing said sodium chloride and said heavy metals; in a third step, dispersing said solid residue from said second step in water to dissolve said sodium chloride thereby forming an aqueous medium including said sodium chloride and said heavy metals; in a fourth step alkalinising the aqueous medium of the third step to a pH from 8 to 14 to precipitate said metals as heavy metal hydroxides;

in a fifth step separating the precipitated heavy metal hydroxides from the aqueous medium of the fourth step and recovering an aqueous sodium chloride solution; and in a sixth step treating said sodium chloride solution of the fifth step on a chelating resin.

2. The process according to claim 1, wherein said smoke originates from the incineration of domestic or municipal waste.

3. The process according to claim 1, wherein an alkaline aqueous medium is used to obtain the heavy metals in the form of a precipitate of metal hydroxides, and separating this precipitate from the aqueous liquid on a chelating resin.

4. The process according to claim 3, wherein the pH of the aqueous medium is regulated between 8 and 14.

5. The process according to claim 3, wherein a chelating resin containing functional groups derived from iminodiacetic and/or aminophosphonic acid is used.

6. The process according to claim 3, wherein a chelating resin of the Na type is used.

7. The process according to claim 3, including acidifying the aqueous medium and then filtering, prior to alkalifying the aqueous medium.

8. The process according to claim 7, wherein when the aqueous medium contains $SO_4^{2-}$ ions, calcium chloride is added to it when it is acidified, to precipitate calcium sulphate.

9. The process according to claim 7, including when said aqueous medium contains $SO_4^{2-}$ ions, adding calcium (hydr)oxide to react with all of the $SO_4^{2-}$ ions.

10. The process according to claim 1, wherein the heavy metals of the smoke are selected from the group consisting of cadmium, mercury, antimony, lead, cobalt, chromium, copper, manganese, vanadium, tin, iron, nickel, aluminum, zinc, and mixtures thereof.

11. The process according to claim 10, wherein the smoke originates from incineration of domestic or municipal waste.

* * * * *